July 2, 1968     E. W. TIPTON     3,391,365
INTERLEAVED WINDING HAVING HIGH SERIES CAPACITANCE
Filed Nov. 14, 1966     2 Sheets-Sheet 1
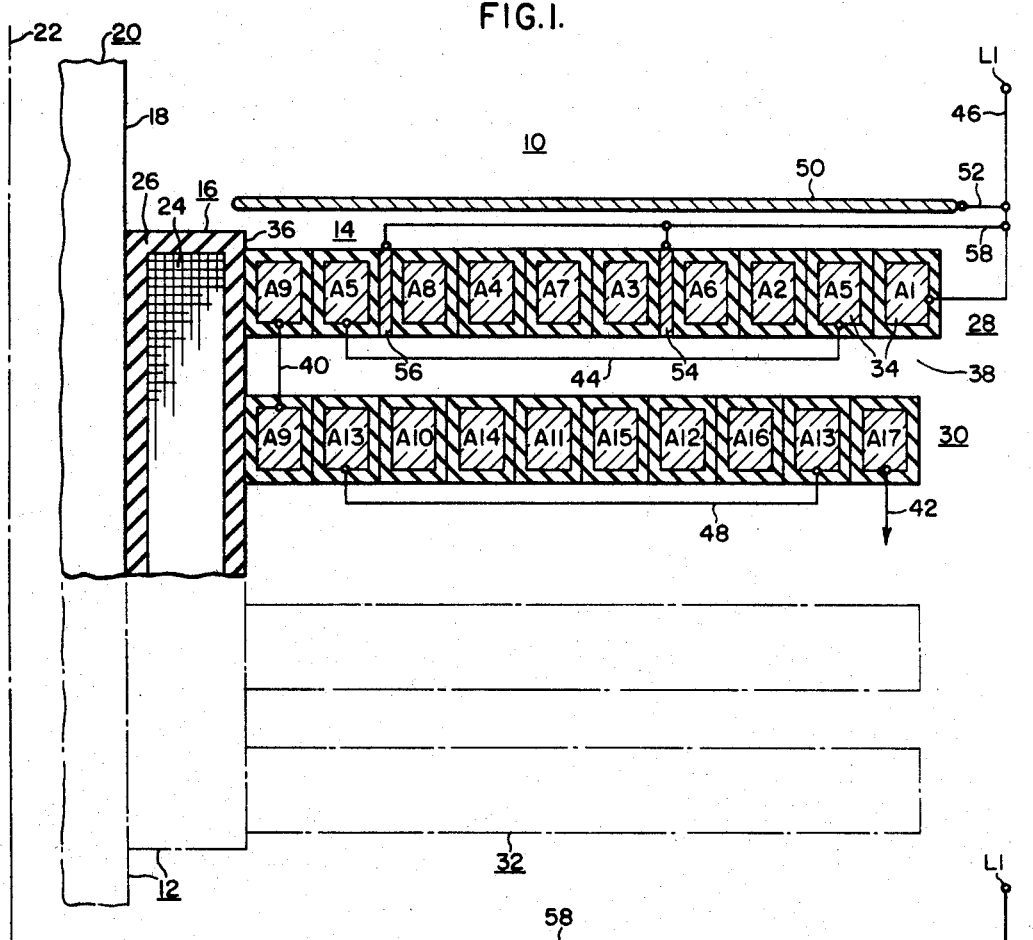
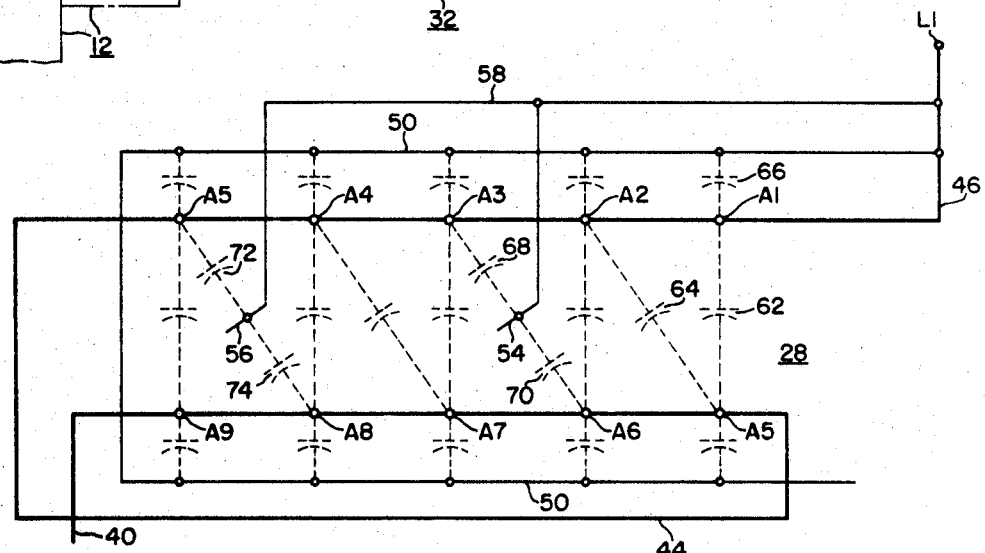
WITNESSES
Theodore F. Wrobel
James T. Young
FIG. 4.
INVENTOR
Earl W. Tipton
BY Donald R. Lackey
ATTORNEY July 2, 1968  E. W. TIPTON  3,391,365
INTERLEAVED WINDING HAVING HIGH SERIES CAPACITANCE
Filed Nov. 14, 1966  2 Sheets-Sheet 2

3,391,365
INTERLEAVED WINDING HAVING HIGH SERIES CAPACITANCE
Earl W. Tipton, Sharon, Pa., assignor to Westinghouse Electric Corporation, Pittsburgh, Pa., a corporation of Pennsylvania
Filed Nov. 14, 1966, Ser. No. 593,985
6 Claims. (Cl. 336—70)

ABSTRACT OF THE DISCLOSURE

A winding structure for electrical inductive apparatus having a plurality of pancake coils of the interleaved turn, high series capacitance type. At least one of the pancake coils having a terminal adapted for connection to an electrical potential. At least the pancake coil having the terminal including at least one electrical conductor disposed between certain of its turns, with the electrical conductor being connected to the terminal.

---

This invention relates in general to winding structures for electrical inductive apparatus, such as transformers, and more particularly to winding structures which have an improved surge voltage distribution characteristic.

Power transformers of the core-form type commonly have a high voltage winding formed of a plurality of disc or pancake type coils, which are connected in electrical series, and stacked in side-by-side spaced relation with their openings in alignment. The pancake coil on one end of this serially connected stack of pancake coils has a terminal adapted for connection to a source of electrical potential, and the pancake coil on the other end is either grounded, or it also has a terminal adapted for connection to the source of electrical potential, depending upon the particular transformer type and its application. Steady state voltage distribution across this type of winding is substantially uniform, being determined inductively by the conductor turns of the pancake coils. The distribution of surge potentials across the winding, and from the various pancake coils to ground, however, such as surge potentials and transients caused by lightning or switching, is non-uniform, with the surge potential concentrating on the first few turns of the pancake coil or coils connected to the source of electrical potential, between the first few pancake coils adjacent the line end or ends of the windings, and from the first few coils adjacent the line end or ends of the winding, to ground.

The degree of non-uniformity in the distribution of surge potentials across the stacked pancake coil type high voltage winding may be determined by the distribution constant alpha ($\alpha$) of the winding, which is equal to the square root of the ratio of the capacitance of the winding to ground, to the series or through capacitance of the winding. Reducing the magnitude of the distribution constant improves the uniformity of distribution of surge potentials across the winding structure, and increasing the magnitude of the distribution constant increases the concentration of surge potentials at the line end or ends of the winding. Thus, in order to reduce the amount of electrical insulation required at the line end of the winding due to surge potentials, which will reduce the mean length of the associated magnetic circuit and make it possible to reduce the size and cost of the complete apparatus, the designer attempts to increase the effective series capacitance of the coils and winding, which will reduce the magnitude of the distribution constant. The effective series capacitance of the coils and winding may be increased by separating physically connected conductor turns of the pancake coils, by a predetermined number of conductor turns from a different portion of the pancake coil or winding. This process, known in the art as interleaving, connects the turn-to-turn capacitances in parallel with the winding, instead of in series. Since parallel connected capacitors add in a manner similar to series connected resistors, the effective series capacitance of the winding is substantially increased.

Many different interleaving arrangements are known in the art, with the basic concept being to radially wind the pancake coils to provide two or more separate sections, the turns of which are interleaved with one another. Then, the sections are electrically interconnected within each coil, between adjacent coils, or both, to place turns from a different portion of the coil or winding between physically connected turns. For examples of interleaving arrangements see U.S. Patent No. 3,090,022, issued May 14, 1963, and U.S. Patent 3,246,270, issued Apr. 12, 1966, both of which are assigned to the same assignee as the present application.

Interleaving the pancake coils to increase the effective series capacitance of the coils and winding, however, to be successful in reducing the concentration of surge potentials at the line end or ends of the winding, requires that the charging time of the spiral electrodes, i.e., the conductor turns, be short compared to the rise or/and fall time of an applied surge potential. This may be readily understood by assuming that the surge potential is a square wave. Thus, at time zero, the voltage applied to the line terminal would already by maximum, and at this instant there would be no current flow. Thus, the winding structure would appear as a plurality of turns separated by insulation. The connection of the turns would be immaterial, as there would be no current flow. Interleaving would therefore, be of no benefit. Fortunately, all surge potentials have a finite rise and fall time, due to the inductance in the conductors leading to the winding. This rise and fall time, however, can be very short. For example, when the impulse wave or surge is chopped on the front of the wave, or just beyond the crest of the wave, the rise and fall time may be less than one micro-second. In these instances, charging time of the pancake coil becomes important, and if the charging time is long compared to the front or fall time of the impulse wave, the benefits of interleaving are lost, with the surge distributing itself substantially the same as across a conventional pancake coil without interleaving.

The charging time of a pancake coil is directly responsive to the mean diameter of the pancake coil and to the number of conductor turns. Thus, the charging time of relatively small coils is usually short relative to the rise and fall time of the voltage impulse waves, but it will readily be seen that a point will be reached in the physical size of the pancake coils where the interleaving of the coil may be rendered ineffective by impulse waves having very fast rise and fall times.

Merely increasing the amount of electrical insulation at the line end or ends of the winding on these larger coils to withstand the higher voltages due to the non-uniform distribution of fast rise and/or fall time surge potentials, in addition to being costly, is partially self-defeating. Increasing the thickness of the insulation between adjacent coils, and between turns of the coils, reduces the series capacitance of the winding at the line end, which causes a still greater concentration of electrical stress, requiring still more insulation.

Co-pending application S.N. 563,768, filed July 8, 1966, which is assigned to the same assignee as the present application, discloses an arrangement which reduces the effective number of turns in certain of the line end coils without reducing the effective series capacitance of these coils. Thus, the charging time of the line end coils is reduced.

It would be desirable, however, to be able to reduce the charging time of the line end coil or coils, and thus enable larger interleaved coils to be used without losing the interleaving effect upon surge potentials having steep wave fronts and/or fast fall times, without any major modification of the pancake coils.

Accordingly, it is an object of the invention to provide a new and improved winding structure for electrical inductive apparatus.

Another object of the invention is to provide a new and improved interleaved type pancake coil structure which has a shorter capacitive charge time than conventional interleaved type coil structures.

Still another object of the invention is to provide a new and improved interleaved turn type pancake coil in which the interleaving effect is not lost upon impulse voltage waves having extremely short rise and/or fall times.

Another object of the invention is to provide new and improved pancake coils having interleaved turns which have substantially the same charging time as smaller conventional interleaved type pancake coils.

A further object of the invention is to provide new and improved interleaved turn type pancake coils in which the charging time has been reduced without major modification to the pancake coil structure.

Briefly, the present invention accomplishes the above cited objects by providing a winding structure having a plurality of serially connected pancake coils of the interleaved turn type. At least the pancake coils connected to the source of potential have at least one electrically conductive member disposed between predetermined conductor turns, which electrically conductive member is connected to the source of potential. This is the only direct electrical connection to this electrically conductive member. Thus, instead of impulse voltages having to penetrate through half of the interleaved turns to bring the interleaved type coil up to full charge potential, the inductance of which may cause a substantial delay, predetermined sections of the pancake coil may be charged directly from the line terminal through the capacitance provided by the additional electrically conductive members.

In effect, the large pancake coil has been broken into a plurality of smaller pancake coils, at least during a surge potential, with the number of smaller sections being determined by the number of additionally electrically conductive members added. The direct connection of the additional electrically conductive members to the line terminal provides additional parallel charging paths to predetermined portions of the pancake coil, which paths have less inductance than the path provided by the conventional conductor turns of the pancake coil. The additional electrically conductive members may be easily added while the pancake coils are being wound, thus requiring little change in the winding procedure, and very little structural change in the coil. Further, the additional electrically conductive members add substantially to the effective series capacitance of the pancake coils, which further aids in effecting a more uniform voltage distribution across the turns of the pancake coil, between the line end pancake coils, and between the line end coils and ground.

Further objects and advantages of the invention will become apparent from the following detailed description, taken in connection with the accompanying drawings, in which:

FIGURE 1 is a partial sectional elevation of the magnetic core and winding structure of a transformer constructed according to the teachings of the invention.

FIG. 4 is an equivalent diagram illustrating the capacitive relationships of the line end pancake coil shown in FIG. 1.

Figure 2:
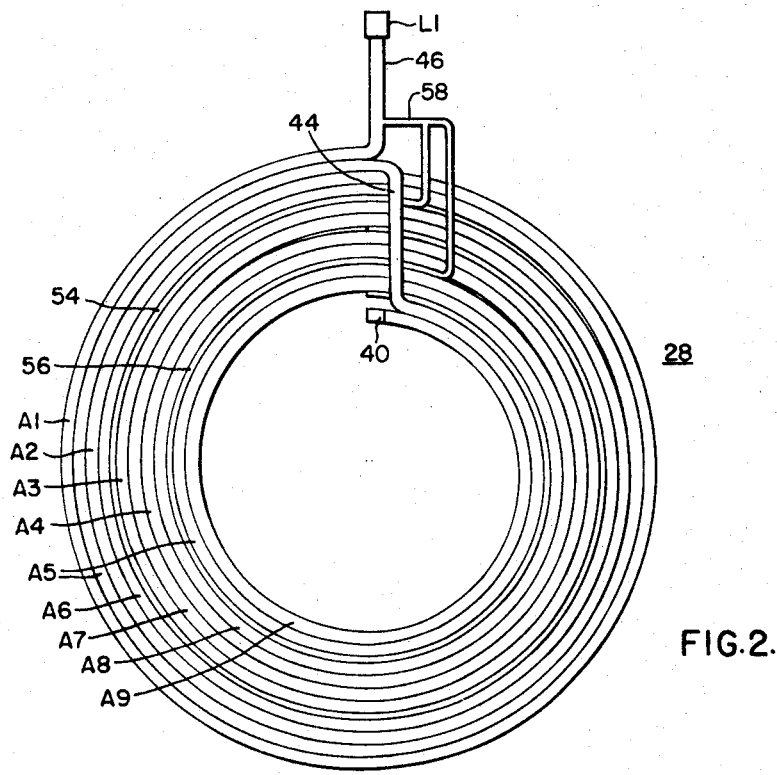
FIG. 2 is a plan view of the line end pancake coil shown in FIG. 1.

The invention relates to improving the surge voltage distribution characteristics of electrical windings having a plurality of serially connected pancake type coils, the conductor turns of which are interleaved to provide a high series capacitance. Any type of interleaving arrangement may be used, with an example of an interleaving arrangement being shown in FIG. 1.

FIG. 1 is a partial sectional elevation of a magnetic core-winding assembly 12 of a transformer 10 constructed according to an embodiment of the invention. The magnetic core-winding assembly 12 includes high and low voltage windings 14 and 16, respectively, concentrically disposed about a leg 18 of a magnetic core assembly 20, in what is commonly referred to as core-form construction. Transformer 10 may be either single or polyphase, with only one phase being illustrated in order to simplify the drawings. Transformer 10 may be of the isolated winding type, with each end of the high voltage winding 14 being adapted for connection to a source of electrical potential, or one end may be adapted for connection to ground, depending upon the particular requirements of the application. Transformer 10 may also be of the autotransformer type, if desired. The high and low voltage windings, 14 and 16, respectively, are concentrically or coaxially disposed relative to an axis or center line 22, with the windings only being shown on one side of center line 22, as their views on the other side of the center line are similar. Low voltage winding 16 may be of any conventional type, having a plurality of conductor turns 24 which are insulated from the magnetic core 22 and the high voltage winding 14 by insulating means 26.

High voltage winding 14 includes a plurality of pancake or disc type coil sections of which pancake coils 28 and 30 are shown adjacent the line end of the winding, represented by line terminal L1. It is to be understood that the invention applies to any plurality of pancake coils, with additional pancake coils being indicated generally at 32.

In general, each of the pancake coils, such as pancake coil 28, includes a plurality of conductor turns 34 spirally wound about an opening 36 for receiving winding leg 18 of magnetic core 20 and low voltage winding 16, forming a substantially disc shape having first and second outer major opposed surfaces and a predetermined radial build or outside diameter. The various pancake coils are stacked with their openings in alignment, with their major surfaces in spaced parallel relation with one another, to form cooling ducts between the adjacent coils, such as cooling duct 38 between pancake coils 28 and 30. The plurality of pancake coils are electrically connected in series, either with start-start, finish-finish connections, as shown in FIG. 1, with the "start" of pancake coil 28 being connected to the "start" of pancake coil 30, via conductor 40, and the "finish" of pancake coil 30 being connected to the "finish" of the next pancake coil via conductor 42, or the plurality of pancake coils may be serially connected using finish-start connections. As used in this specification, the "start" of a pancake coil is always the end of one of its inner turns, and the "finish" of the winding is always the end of one of its outer turns, regardless of where the connections to the pancake coils are made.

The magnetic core-winding assembly 12 may be disposed in a suitable casing or tank (not shown), which may be filled to a predetermined level with a fluid insulating and cooling medium, such as oil or $SF_6$.

The usual approach in reducing the magnitude of the distribution constant is to increase the series capacitance of the pancake coils and the winding by forming the pancake coils in two or more sections and connecting the sections to interleave the turns of the sections. This arrangement changes the turn-to-turn capacitance from a series network to a series-parallel network, which substantially increases the series capacitance of the pancake coils and winding. Thus, as illustrated in FIG. 1, each of the pancake coils 28 and 30 may be formed by spirally winding two radially disposed conductors together, and interconnecting the resulting two sections in series via conductor 44, which connects the end of one section with the opposite end of the other section. In pancake coil 28, line conductor 46, which is connected to line terminal L1, is connected to the "finish" end of one of the coil sections, which conductor turn is numbered A1. This section spirals inwardly, appearing at conductor turns A2, A3, A4 and A5. At the end of this section, the circuit is continued via conductor 44 to the opposite end of the second coil section. The interconnected ends of the two sections are given the same reference numeral A5 to indicate that they are substantially at the same potential. The circuit then continues through the second section, spiralling inwardly and appearing at turns A6, A7, A8 and A9. At conductor turn A9, the circuit continues to the adjacent pancake coil 30 via conductor 40. Since in this example, the pancake coils are start-start, finish-finish connected, conductor 40 enters the normal "start" of one of the coil sections, spiralling outwardly and appearing at turns A9, A10, A11, A12 and A13. At the end of this section, the circuit is brought back to the normal "start" of the second coil section, via conductor 48, and again spirals outwardly, appearing at conductor turns A14, A15, A16 and A17. At the end of the second coil section the circuit enters the "finish" end of the adjacent pancake coil via conductor 42, with the remaining pancake coils, indicated generally at 32, being connected similarly to pancake coils 28 and 30.

A static plate 50, formed of a suitable electrically conductive material, such as copper or aluminum, is disposed adjacent the line end coil 28, in order to reduce stress concentrations adjacent the edges of pancake coil 28, and to enforce a more linear distribution of surge potential across pancake coil 28 by capacitive relationships. Static plate 50 is electrically connected to the line terminal L1 via connector 52.

In order to reduce the charging time of a pancake coil in accordance with the teachings of the invention, at least the line end coil 28, and also the pancake coil at the other end of the winding, if it is connected to the source of potential, have a predetermined number of conductive strip members disposed between predetermined conductor turns. The embodiment of the invention shown in FIG. 1 has two electrically conductive strip members 54 and 56 disposed between turns A6 and A3, and between turns A8 and A5, respectively. Each electrically conductive strip member 54 and 56 is connected to line terminal L1 via conductor 58.

The exact location of electrically conductive strip members 54 and 56 may be more readily apparent from FIG. 2, which is a plan view of pancake coil 28 shown in FIG. 1. As illustrated in FIG. 2, each electrically conductive strip member 54 and 56 is substantially one conductor turn in length, but they may be longer, or shorter, depending upon the particular application. Since the purpose of electrically conductive strip members 54 and 56 is to provide additional parallel paths to charge predetermined portions of the pancake coil, and thus charge the coil more rapidly than it would be through the single connection of the coil to line terminal L1, due to the inductance of the turns which make up the coil, the electrically conductive strip members should have a length sufficient to provide the capacitance required, without introducing too much inductance. For example, it would be possible to interleave the whole pancake coil, from start to finish, with an electrically conductive strip member, which would have but one connection to the power circuit. This arrangement would provide a substantial increase in the effective series capacitance of the winding, but it would not be effective in reducing the charging time of the coil, as the added electrically conductive strip member would itself present a substantial inductance to the charging current. Therefore, it is preferable, instead of utilizing one long additional conductive strip member which extends for a large plurality of conductor turns, to utilize a plurality of discrete shorter conductive strip members, disposed in spaced relation across the build of the pancake coil, with each being separately connected to the line terminal. Therefore, the additional capacitance of the electrically conductive strip members may be realized, but each would present a very low inductance to the charging current, enabling the adjacent turns of the pancake coil to be charged at substantially the same rate as the turns which are immediately adjacent the line terminal. Thus, in effect, predetermined turns throughout the radial build of the pancake coil act as though they were the turns adjacent the line terminal, thus effectively forming a plurality of separate individual pancake coils.

Figure 3:
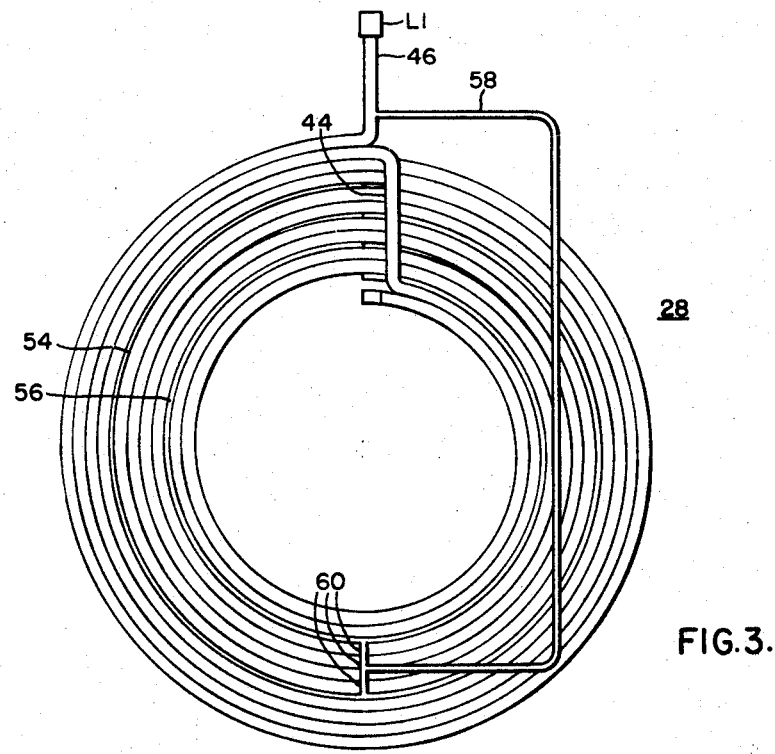
FIG. 3 is a plan view of a pancake coil illustrating a modification which may be used in the pancake coil shown in FIG. 2.

Electrically conductive strip members 54 and 56 are illustrated in FIG. 2 as having one of their ends connected to line terminal L1, with their other ends being unconnected or floating. It may be even more desirable to connect substantially the midpoint of the electrically conductive strip members 54 and 56 to line terminal L1, via conductor 60, as shown in FIG. 3, which arrangement will reduce the effective inductance of the electrically conductive strip members even further. Thus, each end of the electrically conductive strip members will be unconnected or floating.

Since the electrically conductive members 54 and 56 will only carry capacitive charging current, and will never carry load current, their cross-section need not be as large as the cross-section of the conductor turns of the pancake coils, and they may thus be formed of thin strips of electrically conductive material, such as copper or aluminum, and may even be in the form of metallized paper. Although separate insulation is not shown on conductive members 54 and 56 in FIG. 1, in practice they should have about the same thickness of insulation as the conductor turns of the pancake coils. The axial length of the electrically conductive members 54 and 56 is illustrated in FIG. 1 as being substantially the same as the axial width of the conductor turns, but it may be less if desired.

The object of the electrically conductive strip members, as hereinbefore stated, is to more rapidly charge pancake coil 28, in order to retain the advantages of interleaving, even when voltage impulse waves which have very fast rise and fall times are applied thereto. For example, in an interleaved turn type pancake coil, it is known that if one-quarter period of the natural oscillation of the pancake coil occurring during the charging or discharging period becomes longer than the wave front time, or of the fall time, of the surge potential, the paralleling effect of the turn-to-turn capacitances is reduced, and the interleaved turn type pancake coil starts to approach the condition of a non-interleaved pancake coil, increasing the electrical stress on the line end of the winding accordingly. Therefore, the number of individual electrically conductive strip members is determined by that number necessary to charge the pancake coil in a time which is short compared with the fastest rise and/or fall times to be encountered on impulse voltage waves.

In a pancake coil having two interleaved sections, as shown in FIG. 1, it is desired to rapidly charge, through the additional capacitances, at least the first $N/2$ turns, where N is the number of turns in each of the interleaved groups. Thus, the turns of the one group should be rapidly charged by the conductive strips, which will then cause the turns of all of the groups to be rapidly charged.

The additional electrically conductive members 54 and 56, which form "plates" of additional capacitors, having low inductive charging paths to the line terminal, connected in parallel with the other charging paths, such as the charging paths through the interleaved sections of the coil, and through the static plate 50, add substantially to the through or series capacitance of the line end coil or coils, which aids in more uniformly distributing surge potentials across the line end of the winding. Thus, the electrically conductive members 54 and 56, in addition to making effective the high series capacitance of the pancake coils on fast rise and fall time voltage waves, adds additional effective series capacitance of its own. This may be readily observed from the equivalent diagram shown in FIG. 4, which illustrates the capacitive relationships of pancake coil 28.

As shown in FIG. 4, the two serially connected interleaved sections of pancake coil 28 form capacitance between the turns, such as between turns A1 and A5, as illustrated at 62, and between turns A5 and A2, as illustrated at 64, which capacitances are connected between the serially connected coil sections, with the resulting parallel connected capacitances of the interleaved turns adding in the manner of serially connected resistors. Static plate 50, which is disposed adjacent all of the conductor turns of pancake coil 28, adds another parallel charging path through the capacitances between each conductor turn and the static plate, such as capacitance 66 between turn A1 and static plate 50. Capacitance 66 is smaller than the normal turn-to-turn capacitance, such as capacitance 62, as the spacing from the plate to the turns is larger. The capacitance from the conductor turns to the static plate are connected in parallel with respect to the power circuit, which again adds the values of the parallel connected capacitances to the effective series or through capacitance of the pancake coil.

Static plate 50, although reducing the charging time of the line end pancake coil through its capacitive relationship with the line end coil, will not bring the pancake coil up to voltage rapidly enough on surge potentials having extremely fast rise and fall times. Therefore, the teachings of the invention are applicable. For example, in order to charge turn A8 rapidly with conventional interleaving, turn A4 or A5 must be rapidly charged. To charge turn A4 or A5 rapidly requires that the charging current flow through the preceding turns, the inductance of which will increase the charging time of the more distant turns. On voltage impulse waves having fast rise and fall times, compared to the coil charging time, the pancake coil will not have been charged before the voltage impulse wave reaches its crest, thus the effectiveness of the interleaving is substantially impaired or lost, and the pancake coil presents the same effect to the impulse waves as a conventional coil which has not been interleaved. Thus, in accordance with the teachings of the invention, one or more conductive strip members, such as electrically conductive members 54 and 56, are disposed between predetermined conductor turns, such as turns A3 and A6, and turns A5 and A8, respectively. Since these additional electrically conductive members are connected directly to the line terminal L1, the capacitance formed by the additional electrically conductive members spaced from the adjacent conductor turns, may be more rapidly charged than through the conductor turn structure of the pancake coil itself, thus preserving the effect of interleaving. For example, electrically conductive member 54 forms capacitance 68 and 70 between conductor turns 83 and 86, respectively, which capacitance is connected directly to line terminal L1. Conductive member 56 forms capacitance 72 and 74 between conductor turns 85 and 88, respectively, which capacitance is also connected directly to the line terminal L1. This parallel connected capacitance between turns, formed by the additional electrically conductive strip members, thus adds to the effective series capacitance of the winding, with the capacitance between the conductive turns having the electrically conductive strips wound therein being substantially twice that contributed by the turns not having the additional conductive strip members.

In summary, there has been disclosed a new and improved interleaved turn type pancake coil and winding structure for electrical transformers in which certain of the line end coils have a shorter capacitive charging time, and higher effective series capacitance, than conventional interleaved type pancake coils. These features enable larger interleaved pancake coils and windings to be constructed without losing the advantages of interleaving on impulse voltage waves having fast rise and fall times. Further, the increased series capacitance and shorter capacitive charging times have been achieved without major modification of the pancake coil and winding structure, requiring only that at the time of winding certain of the coils that one or more electrically conductive strip members be wound between predetermined conductor turns, which strip members are connected to the line terminal.

It is to be emphasized that the interleaving arrangements shown in the figures are for illustrative purposes only, and that the invention applies equally to any type of interleaving applied to pancake type coils to increase their effective series capacitance.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A winding for electrical inductive apparatus comprising a plurality of pancake type coils connected in series circuit relation, at least one of the pancake type coils at one end of the ends of the serially connected pancake coils having a terminal thereon adapted for connection to an electrical potential, said plurality of pancake type coils each having a plurality of insulated conductor turns, said plurality of conductor turns being interleaved to separate physically adjacent turns by a predetermined number of turns which are from a different portion of the winding, substantially increasing the series capacitance of said plurality of pancake coils, at least one electrical conductor having a predetermined length, said at least one electrical conductor being disposed between predetermined conductor turns of said at least one pancake coil having said terminal thereon, and conductor means electrically connecting said at least one electrical conductor to said terminal 2. The winding of claim 1 including a plurality of electrical conductors having predetermined lengths, said plurality of electrical conductors being disposed between predetermined different conductor turns of said at least one pancake coil, and conductor means connecting said plurality of electrical conductors to said terminal.

3. The winding of claim 1 wherein said conductor means is connected to one of the ends of said at least one electrical conductor.

4. The winding of claim 2 wherein said conductor means is connected to one of the ends of each of said plurality of electrical conductors.

5. The winding of claim 1 wherein said conductor is connected to substantially the midpoint of said at least one electrical conductor.

6. The winding of claim 2 wherein said conductor means is connected to substantially the midpoint of each of said electrical conductors.

(References on following page)

References Cited

UNITED STATES PATENTS

| | | | |
|---|---|---|---|
| 2,279,027 | 4/1942 | Weed et al. | 336—70 |
| 3,090,022 | 5/1963 | Stein | 336—69 XR |
| 3,160,838 | 12/1964 | Bedil | 336—69 |

OTHER REFERENCES

Hitachi Limited, German app. No. 1,069,279, published Nov. 19, 1959.

DARRELL L. CLAY, *Primary Examiner.*

T. J. KOZMA, *Assistant Examiner.*